(12) United States Patent
Czernik

(10) Patent No.: US 12,458,919 B2
(45) Date of Patent: Nov. 4, 2025

(54) COMPACT CANISTER OF THE BED OF CARBON DIOXIDE ABSORBENT (SCRUBBER)

(71) Applicant: XDEEP SP. Z O.O. SP. K., Gora (PL)

(72) Inventor: Piotr Czernik, Gora (PL)

(73) Assignee: XDEEP SP. Z O.O. SP. K., Góra (PL)

( * ) Notice: Subject to any disclaimer, the term of this patent is extended or adjusted under 35 U.S.C. 154(b) by 0 days.

(21) Appl. No.: 18/037,985

(22) PCT Filed: Jan. 18, 2023

(86) PCT No.: PCT/PL2023/000002
§ 371 (c)(1),
(2) Date: May 19, 2023

(87) PCT Pub. No.: WO2024/155199
PCT Pub. Date: Jul. 25, 2024

(65) Prior Publication Data
US 2025/0114738 A1    Apr. 10, 2025

(51) Int. Cl.
*B01D 53/14* (2006.01)
(52) U.S. Cl.
CPC .... *B01D 53/1475* (2013.01); *B01D 2257/504* (2013.01)
(58) Field of Classification Search
CPC .......... B01D 53/1475; B01D 2257/504; B01D 2251/304; B01D 2251/404; B01D 2251/604; B01D 53/0415; B01D 53/04; B63C 11/24
See application file for complete search history.

(56) References Cited

U.S. PATENT DOCUMENTS

| | | | | |
|---|---|---|---|---|
| 5,330,723 | A * | 7/1994 | Martin | B01D 53/266 55/482 |
| 7,658,891 | B1 * | 2/2010 | Barnes | C01B 13/11 128/205.28 |
| 2017/0354915 | A1 * | 12/2017 | O'Coin | B63G 8/36 |
| 2021/0317803 | A1 * | 10/2021 | Cronin | F02M 25/0854 |

(Continued)

*Primary Examiner* — Dung H Bui
(74) *Attorney, Agent, or Firm* — Andrzej Malarz, Esq.

(57) ABSTRACT

The object of the invention is a compact canister of carbon dioxide absorbent bed (scrubber) with cross-flow with channels of constant pressure throughout the cross-section comprising a 2-part housing, the side wall (6) of which is provided with an opening (12) and a flange (7) for attaching the head (11) of the scrubber, and the lower wall (17) in the connector (4) with the counterlung (35), inside of which there are two screens attached between which there is an absorbent bed (5) characterized in that the top screen (19) and the bottom screen (20) are parallel to each other, the top screen (19) is attached along the upper wall (15) of the canister (1), the free space between the top screen (19) and the upper wall (15) of the canister (1) forms the upper air channel (25) connected to the opening (12) of the side wall (6), the bottom screen (20) is attached along the lower wall (17) of the canister (1), the free space between the bottom screen (20) and the lower wall (17) of the canister (1) forms the lower air channel (26) connected to the connector (4) of the counterlung (35) and the flow of the stream of gas (32) flows across the scrubber bed (5) perpendicular to the planes of the screens (19, 20).

8 Claims, 14 Drawing Sheets

(56) References Cited

U.S. PATENT DOCUMENTS

Figure 1:
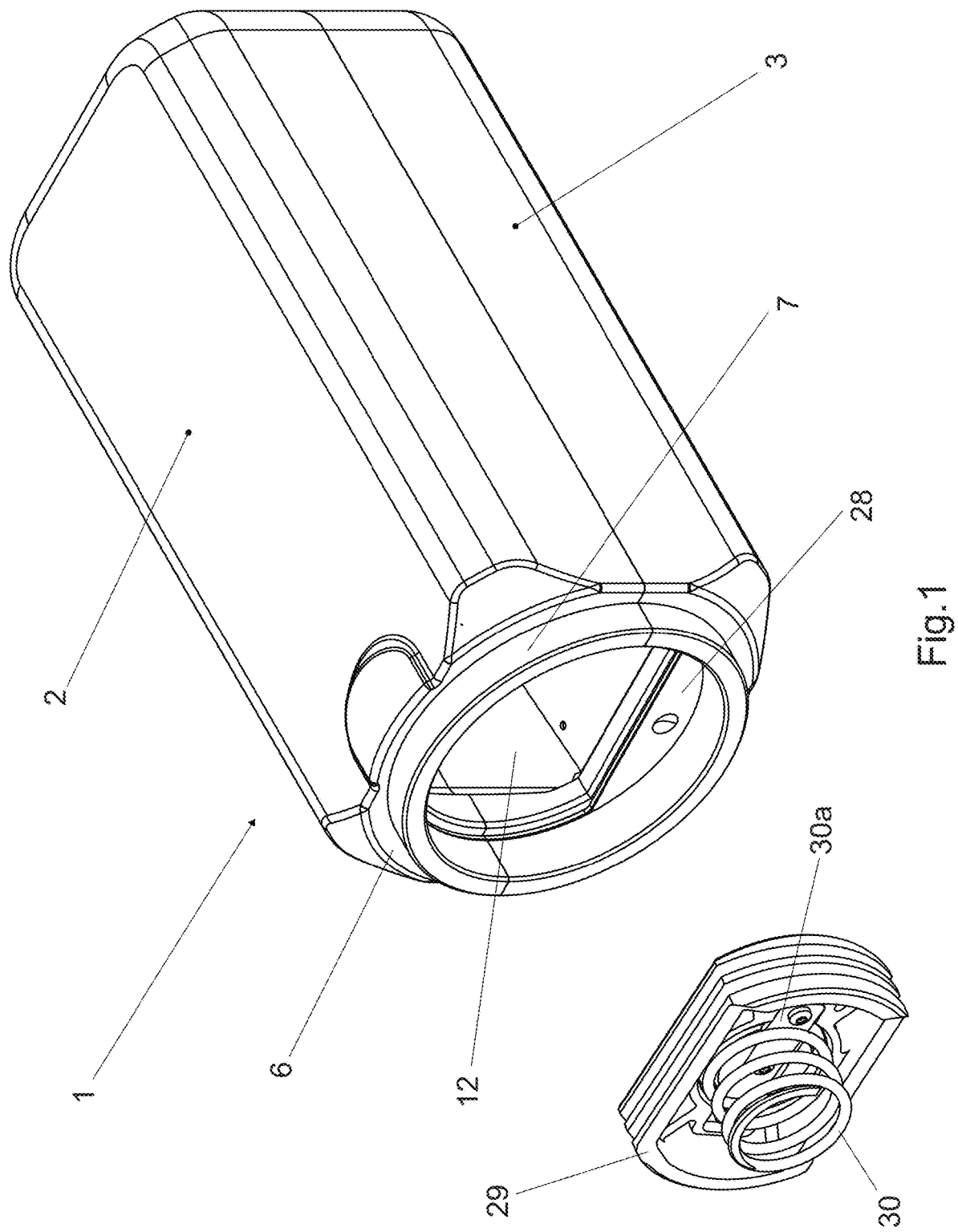

2022/0008686 A1* 1/2022 Krüger .................. A62B 19/00
2023/0104813 A1* 4/2023 Poon ................... B01D 53/053
                                                    128/205.27

* cited by examiner

Fig. 9  B-B

COMPACT CANISTER OF THE BED OF CARBON DIOXIDE ABSORBENT (SCRUBBER)

CROSS REFERENCE TO RELATED APPLICATIONS

The present application is a U.S. National Phase of International Patent Application PCT/PL2023/000002, filed on Jan. 18, 2023, the content of each is incorporated by reference in its entirety for all purpose.

The object of the invention is a compact carbon dioxide absorbent bed canister (scrubber) with cross-flow with channels of constant pressure throughout. The device constitutes part of the diver's equipment in diving systems with a closed-circuit breathing medium (CCR—Closed Circuit Rebreather). The device allows both recreational diving and specialized technical diving. It allows it to be configured for a number of different configurations depending on the type of dive being carried out-it can be a sidemount configuration, but also a backmount with a single cylinder or two-cylinder set. It is also possible to configure a dual rebreather, in which two devices (primary and backup) are mounted to a single harness.

Systems for diving with a closed circuit for the breathing medium (CCR, rebreather) work on the principle that the diver breathes the same gas (enriched air, trimix) all the time, and the carbon dioxide released by the diver is removed by a so-called absorbent. Absorbent is a mixture of lime and caustic soda and is in granular form (e.g. Sofnolime 797). Additionally, oxygen is supplemented in the breathing mixture by its controlled dosage to the breathing loop. The absorbent is located in a module called a scrubber. It is usually a mesh can into which granules are loaded. The scrubber has several tasks. First-to ensure proper (i.e. uniform) gas flow through the entire absorbent bed. Second-to prevent the absorbent from entering the respiratory loop, as it is an irritant that can cause skin burns, eye damage and respiratory irritation. Third-ensure thermal insulation at the required level (a cold absorbent is less effective because chemical reactions occur too slowly in it). Fourth-to allow condensate and water that is a product of chemical reactions to be discharged from the bed.

In addition, the scrubber's design should also minimize the risk of channeling effect. This effect is based on the uneven flow of gas through the bed, which results in faster wear of the bed in the areas with the highest flow and the risk of an increase in $CO_2$ concentration, even though the entire bed still has a high absorption capacity. The risk of the channeling effect is most influenced by the incompetent backfilling of the bed, the absorbent is loose (weakly compacted) in some places, the screens are not positioned parallel so that the bed has an uneven thickness/height. By thickness or height is meant the dimension in line with the direction of gas flow through the bed. The larger the surface area of the bed when backfilling, the more difficult it is to arrange the absorbent evenly, and thus the greater the risk of the aforementioned effect. To minimize the risk of channeling, solutions are used in the form of pressing the cover or screen with springs, but the larger the surface area of the cover or screen, the less effective they are.

In the case of different diving configurations, it should be taken into account that the placement and configuration, oxygen cylinders, individual auxiliary components, and breathing agent supply lines to the diver's mouth may be different each time. Existing CCR systems are tailored to one specific configuration, and there is no universal solution possible for all configurations.

The standards and norms for diving equipment designed for technical diving and diving with CCR systems are much higher and stricter than those provided for recreational diving. Technical diving generally takes place in flooded confined spaces (with a ceiling over the diver's head) often without visibility of sunlight and the water surface For example, technical diving may involve underwater industrial installations, caves or wrecks. In technical diving, cylinders are generally placed not on the back but on the sides of the torso (the so-called sidemount configuration). Due to the high danger and small amount of space to maneuver, equipment for this type of diving must be as compact and reliable as possible and, in addition, all equipment should meet the requirement for integration with a diving harness.

Two types of scrubbers, usually in the form of a cylinder, are known and commonly used: radial and axial.

From the U.S. patent descriptions U.S. Pat. No. 7,520,280B2 "Rebreather apparatus" and U.S. Pat. No. 8,272,381B2 "Closed circuit rebreather" a CCR system with a radial scrubber, in which the walls are made of mesh and a tube with openings is placed in the center of the scrubber is known. Gas flows across, from tube to wall or vice versa. These types of scrubbers are used in X-CCR[1] and Flex CCR[2] systems, and, are available as optional accessories for many other CCR systems including the JJ-CCR[3] system. The advantage of radial scrubbers is that they are more resistant to errors in backfilling, making it easier to avoid the occurrence of the channeling effect. The disadvantage of this type of scrubbers is their large diameter due to the fact that the minimum height of the absorbent bed, necessary for the proper occurrence of chemical reactions, is about 50 mm. Radial scrubbers are large and cumbersome so they are most often used in backmount configurations.

[1] https://ccr.sub-gravity.com/x-ccr/
[2] https://flexccr.com/scrubber-and-can/
[3] https://www.totalimmersiondiving.com.au/product/j-ccr-radial-scrubber/

The use of a radial scrubber integrated into the harness in a sidemount configuration is problematic because it would have to have a very large diameter to function properly. Assuming the minimum height of the bed to ensure uniform flow (50 mm), taking into account the diameter of the internal and external channels and the thickness of the walls, the diameter of the scrubber canister of this type must be more than 180 mm, which makes the solution cumbersome.

From U.S. patent description U.S. Pat. No. 4,781,184A "Closed circuit breathing apparatus and method of using same" and British patent description GB2357979A "Breathing apparatus", a CCR system with an axial scrubber in which gas flows from one end of the cylinder to the other is known. Depending on the height of the bed, we distinguish between axial tubular scrubbers and axial flat scrubbers.

Tubular axial scrubbers are commonly used in many CCR systems including KISS Sidewinder[4] or JJ-CCR[5]. The advantage of tubular axial scrubbers is that they are easy to fill, making it unlikely that the channeling effect will occur. The small diameter of the scrubber canister is also an advantage, causing this type of solution to be often used in sidemount configurations. A major problem with tubular axial scrubbers is the thickness of their bed, which, combined with their smaller diameter, results in high breathing resistance. For example, in the KISS Sidewinder, the cylinder canister diameter is about 100-120 mm, while the thickness of the bed is 200 mm. An additional problem with this type of solution is the drainage of condensate, which must flow through the entire bed and poor thermal insula-

[4] https://www.kisssidewinder.com/opis-jednostki
[5] https://jj-ccr.com/the-jj-ccr-rebreather/

Although the solution used in the KISS Sidewinder allows the construction of sidemount and backmount configurations using the same components and integration with the harness, it has two problems. The first is poor thermal insulation. Increasing the insulation would require increasing the diameter of the scrubber, thus increasing the size of the device. The second problem is the inability to increase the volume of the scrubber by increasing its length. Elongation of the axial scrubber bed, while keeping the same bed diameter, results in an increase in respiratory resistance beyond the acceptable limit.

There is less breathing resistance in axial flat rebreathers, which also take the form of a cylinder and the gas flows from one end to the other, but the thickness of the bed is smaller at 50-60 mm. Scrubbers of this type, in order to ensure adequate bed volume (with a small thickness), must have very large diameters. A popular CCR system using this type of scrubber is CCR Revo[6], which uses two scrubbers working in series to reduce the diameter (although it is still 154 mm). The disadvantage of this solution is that it is highly susceptible to the effect of channeling when backfilling is not done properly (it is necessary to line up the entire bed perfectly evenly, which is problematic with a large area). The CCR Revo solution with two scrubbers positioned transversely to the diver's body axis, requires the use of large-diameter scrubbers to provide the required absorbent volume. The solution used makes it impossible to build a CCR in a sidemount configuration due to the excessive size of such a machine. In addition, the large size makes it impossible to build the device in a side-by-side (sidemount) configuration. The design and configuration of the device does not allow the use of standard diving cylinders.

[6] http://www.revo-rebreathers.com/products/revo-iii-closed-circuit-rebreather/standard/WO Summing up, existing conventional CCR system solutions are large in size. In an attempt to integrate the design into a single device, when using a 3 kg bed the whole unit is about the size of an 80 cubic foot (80 cf, approximately 60 cm high and 20 cm in diameter) diving cylinder.

The dimensions of existing devices restrict their positioning on the diver's body to two positions. For backmount configurations through the body in the middle of the diver's back (such as: JJ CCR, X-CCR, CCR Revo). For a sidemount configuration along the diver's body on the right side, the CCR must be a separate device, not integrated into the harness and, in addition, its size means that only three cylinders can be carried because the CCR replaces one cylinder.

Machines in the backmount configuration are significantly different from the sidemount configuration, which results in the inability to ensure the versatility of the device.

The device according to the invention reduces the above problems and inconveniences.

The compact canister of carbon dioxide absorbent bed (scrubber) according to the invention provides full versatility of components, the same canisters, heads, manual addition valve MAV and breathing loop can be used in sidemount and backmount configurations. The only variable elements dependent on the diving configuration are the harness (rigid or soft) and the appropriate counterlung for a given harness.

The solution according to the invention fulfills the requirement for integration with any harness, increases the portability of the whole device and allows taking up to four standard diving cylinders.

The compact canister of carbon dioxide absorbent bed (scrubber) according to the invention makes it possible to increase the volume of the bed while keeping the same outer diameter—ensuring portability and the ability to integrate it into a harness.

The compact canister of carbon dioxide absorbent bed (scrubber) according to the invention makes it possible to increase the volume of the bed while maintaining the same bed height-ensuring the minimization of breathing resistance.

The device according to the invention provides improved thermal insulation without increasing the diameter of the device.

The compact canister of carbon dioxide absorbent bed (scrubber) according to the invention reduces the risk of channeling effect and ensures constant pressure of gas flowing through the device.

The above tasks were achieved by making a compact canister of carbon dioxide absorbent bed (scrubber), which, according to the invention, comprises a housing consisting of two permanently connected parts. The upper part and the lower part. The side wall of the housing is provided with an opening blocked by a plug with a spring and a flange for attaching the scrubber head. The bottom wall is provided with a connector for attaching a counterlung. Inside the scrubber canister housing, two screens are attached, the top screen and the bottom screen. Between the screens there is an absorbent bed. It is preferable that the cross-section of the absorbent bed has a rectangular shape. The top screen and the bottom screen are parallel to each other. The top sieve is attached along the top wall of the scrubber canister. The free space between the top screen and the top wall of the scrubber canister forms the upper air channel. The upper air channel is connected to the opening of the side wall. The bottom sieve is attached along the bottom wall of the scrubber canister. The free space between the bottom screen and the bottom wall of the scrubber canister forms the lower air channel. The lower air channel is connected to the counterlung connector. The flow of the gas stream in the absorbent occurs across the absorbent bed perpendicular to the screen planes.

The presented solution allows increasing the volume of the bed by elongating the scrubber canister. The longer scrubber canister has more space for the absorbent while maintaining the same diameter of the canister (in our case, while keeping the cross-sectional area of the scrubber identical). Increasing the length of the scrubber canister elongates the bed but does not entail a change in its height, and thus respiratory resistance remains at an optimal level. In addition, elongating the bed while maintaining its height reduces breathing resistance, as the same gas flow is distributed over a larger working area of the bed. Additionally, in the proposed design, air channels located at the top and bottom of the absorbent bed constitute additional thermal insulation of the bed. The design allows easy draining of condensate and water (which are products of chemical reactions) from the absorbent bed through the counterlung connector located at the bottom of the scrubber housing. The proposed design minimizes the risk of a channeling effect, that is, the effect of uneven gas flow through the bed, which causes faster wear of the bed in areas with the highest flow and the risk of an increase in $CO_2$ concentration, even though the entire bed still has a high absorption capacity. In the proposed design, the screens are attached in parallel and the bed has a fixed height-which guarantees an even flow of gas throughout the bed.

It is preferable that the top screen and the bottom screen are inclined at an acute angle to the longitudinal axis of the scrubber canister. The cross-sectional area of the upper air channel increases toward the side wall with the opening. The cross-sectional area of the lower air channel decreases toward the side wall with the opening. In addition, the scrubber of the absorbent bed is inclined with respect to the longitudinal axis of the scrubber canister at an acute angle with the same value as the angle at which the parallel screens are inclined.

Preferably, the cross section of the upper air channel has a rectangular shape, the cross section of the lower air channel has a rectangular shape, and the cross section of the absorbent bed has a rectangular shape.

The proposed solution with channels of variable cross-section, linearly dependent on the surface area of the absorbent bed provides the possibility of obtaining constant pressure of the gas stream flowing through the device, which guarantees correct (i.e. uniform) gas flow through the entire absorbent bed. The amount of gas flowing is greatest near the entry and exit, so that's where the channels must have the largest cross-section. Less gas flows at the end of the channel, so its cross-section may be smaller.

It is preferable that all the side walls of the scrubber canister, except the side wall with an opening, have double side walls between which there is an air chamber. The upper wall of the scrubber canister, on the internal side of the device, is provided with an upper thermal insulation plate and the lower wall of the canister, on the internal side of the device, is provided with a lower thermal insulation plate.

Thermal insulation of the scrubber canister is crucial, as cold absorbent is less effective and chemical reactions occur too slowly in it. In the solution used, all the places where the absorbent comes into contact with the scrubber canister housing have double side walls with air chambers providing thermal insulation. Thermal insulation plates prevent condensation of water vapor from the air inside the channels. Additionally, as mentioned earlier, the air channels located at the top and bottom of the absorbent bed constitute its additional thermal insulation.

It is preferable that each screen comprises a holder with an attached mesh.

Although the screen can also be made as a single element, allowing air to flow freely through the screen, such as the openwork mesh itself or a perforated plastic or metal element. The proposed screen design is characterized by higher rigidity than the openwork mesh itself and lower breathing resistance than the perforated element. The mesh holes can be perfectly matched to the diameter of the granules of standard absorbents.

Preferably, the housing on the inside is provided with a frame and supports, the height of which relative to the upper wall and the lower wall of the housing varies linearly along the longitudinal axis of the scrubber canister. The frame and supports constitute a point of support and attachment of screen holders.

The frame and supports ensure positioning of the screens inside the housing at the correct angle. The frame and supports prevent the screens from bending when filling the bed, which makes the screens parallel and the bed perfectly uniform throughout, and this eliminates the possibility of the channeling effect.

It is preferable that the top screen holder is provided with an extension splitting the opening of the side wall with a flange into two parts, i.e. the opening of the upper air channel and the filling port.

The use in the above invention of filling through the shorter side wall causes that the height of the bed (restricted by screens from the top and bottom) is always perfectly uniform, which eliminates the possibility of channeling effect occurrence.

Preferably, the housing on the side wall with a flange is provided with a guide, in which a rotary aperture is embedded and the filling port is blinded by a plug with a spring attached to it.

The use of a rotary aperture greatly increases the safety of using the scrubber. When filling the scrubber canister, the aperture prevents the absorbent (which is an irritant that can cause skin burns, eye damage and respiratory irritation) from entering the breathing loop. Additionally, the above solution is resistant to possible user errors, if a diver forgets to leave the aperture in the working position after filling in the absorbent, during the first test of the device's operation, high breathing resistance will indicate an obstructed air channel and leaving the aperture in the filling position.

The proposed compact design, the arrangement of entries and exits and the relatively small dimensions of the scrubber canister of carbon dioxide absorbent bed (scrubber) according to the invention ensure full versatility of the components, which guarantees the possibility of its use in both sidemount and backmount configurations.

Figure 2:
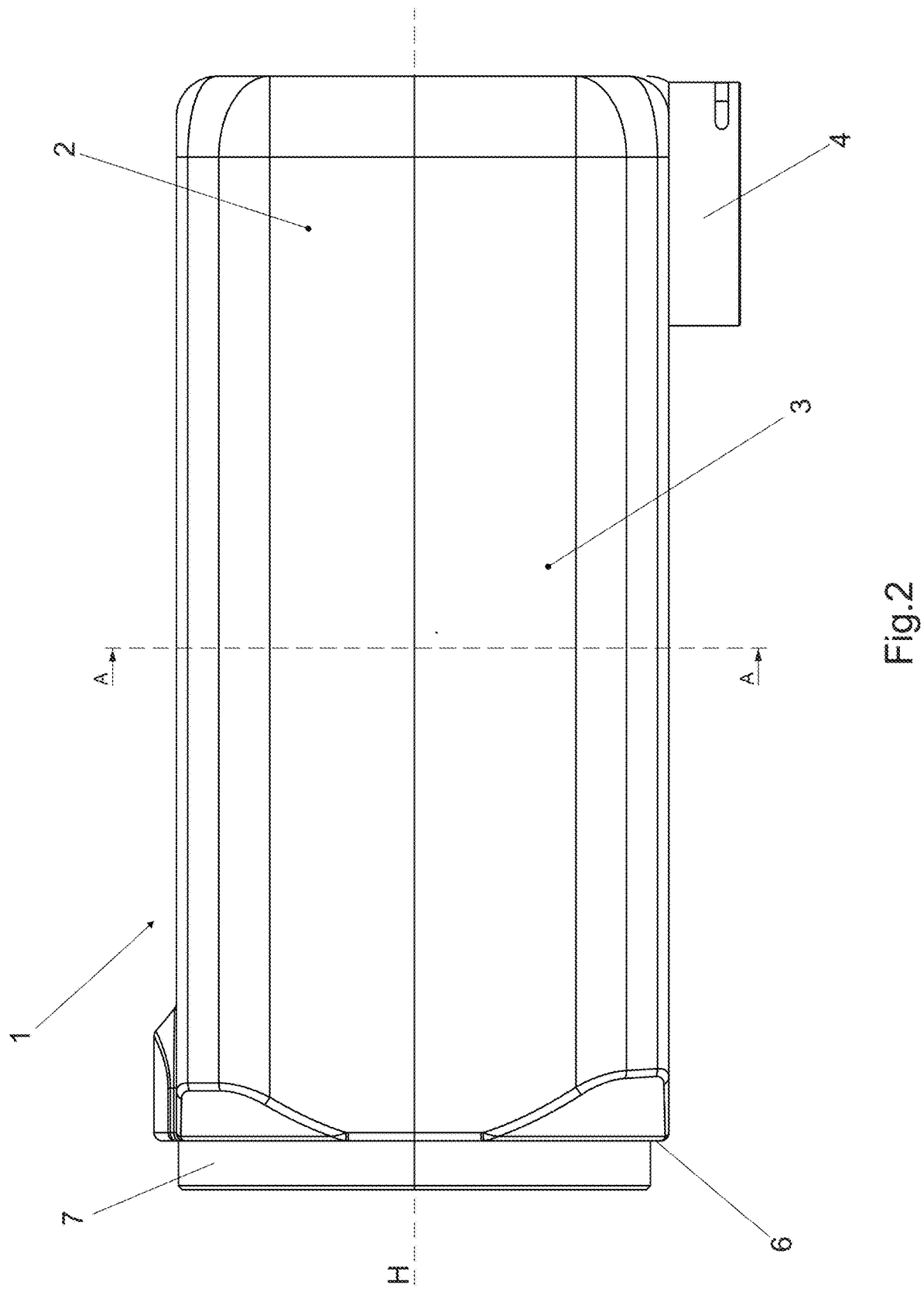
Figure 3:
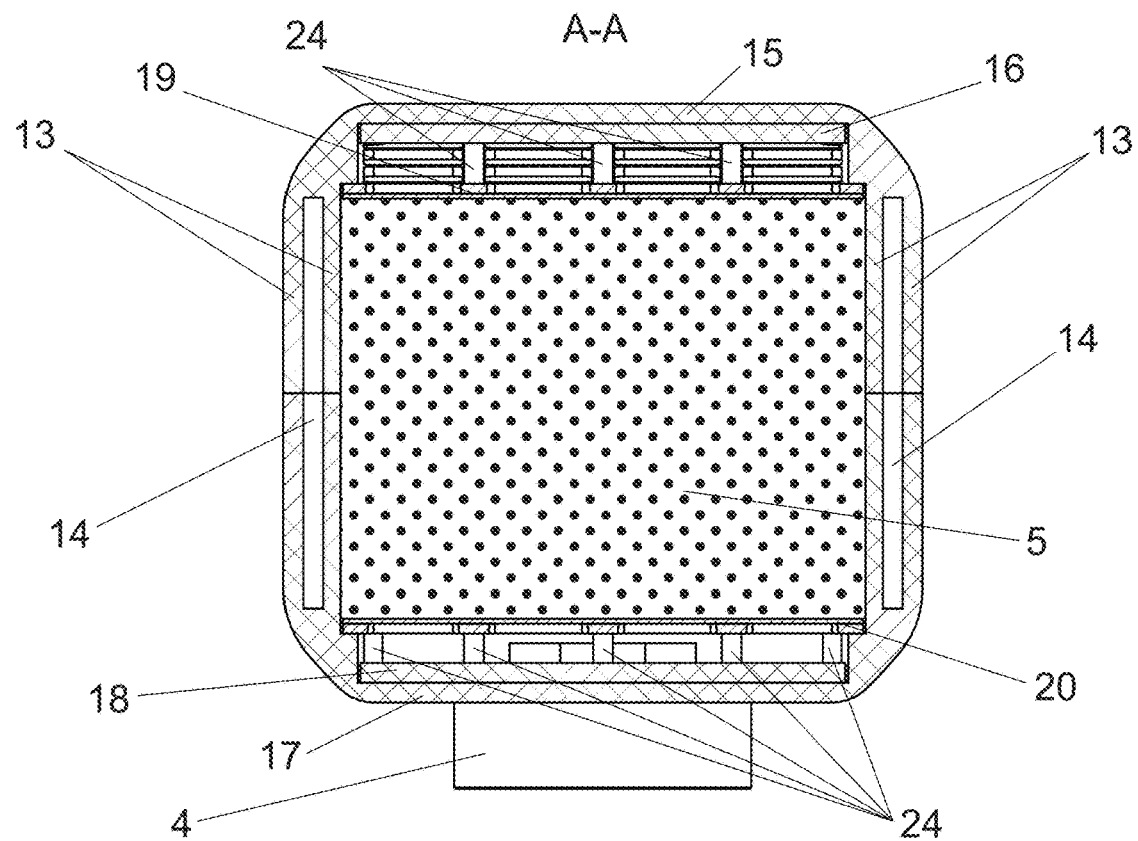
Figure 4:
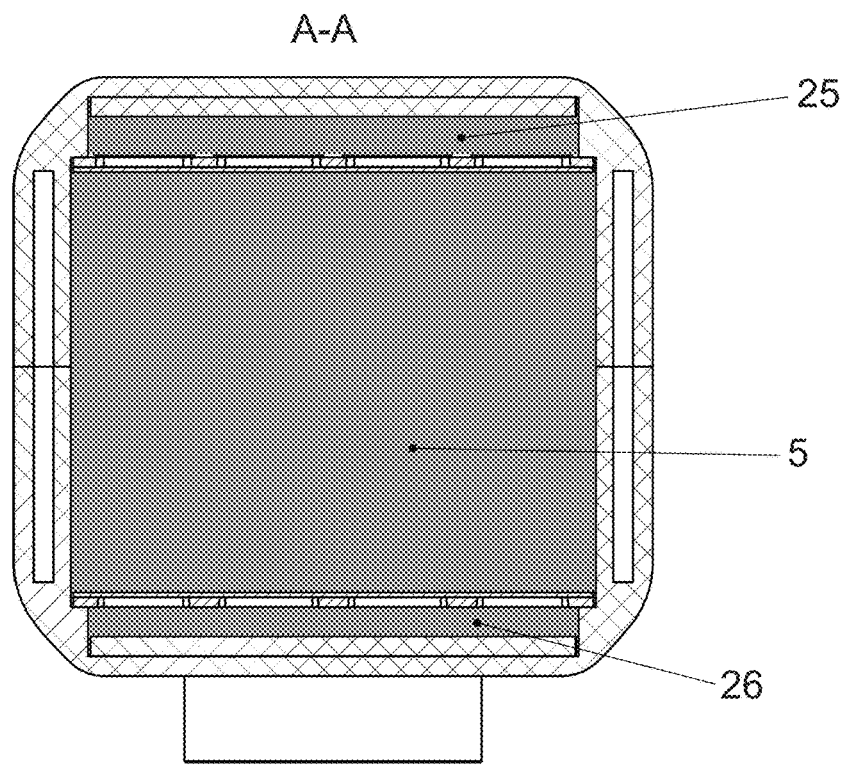
Figure 5:
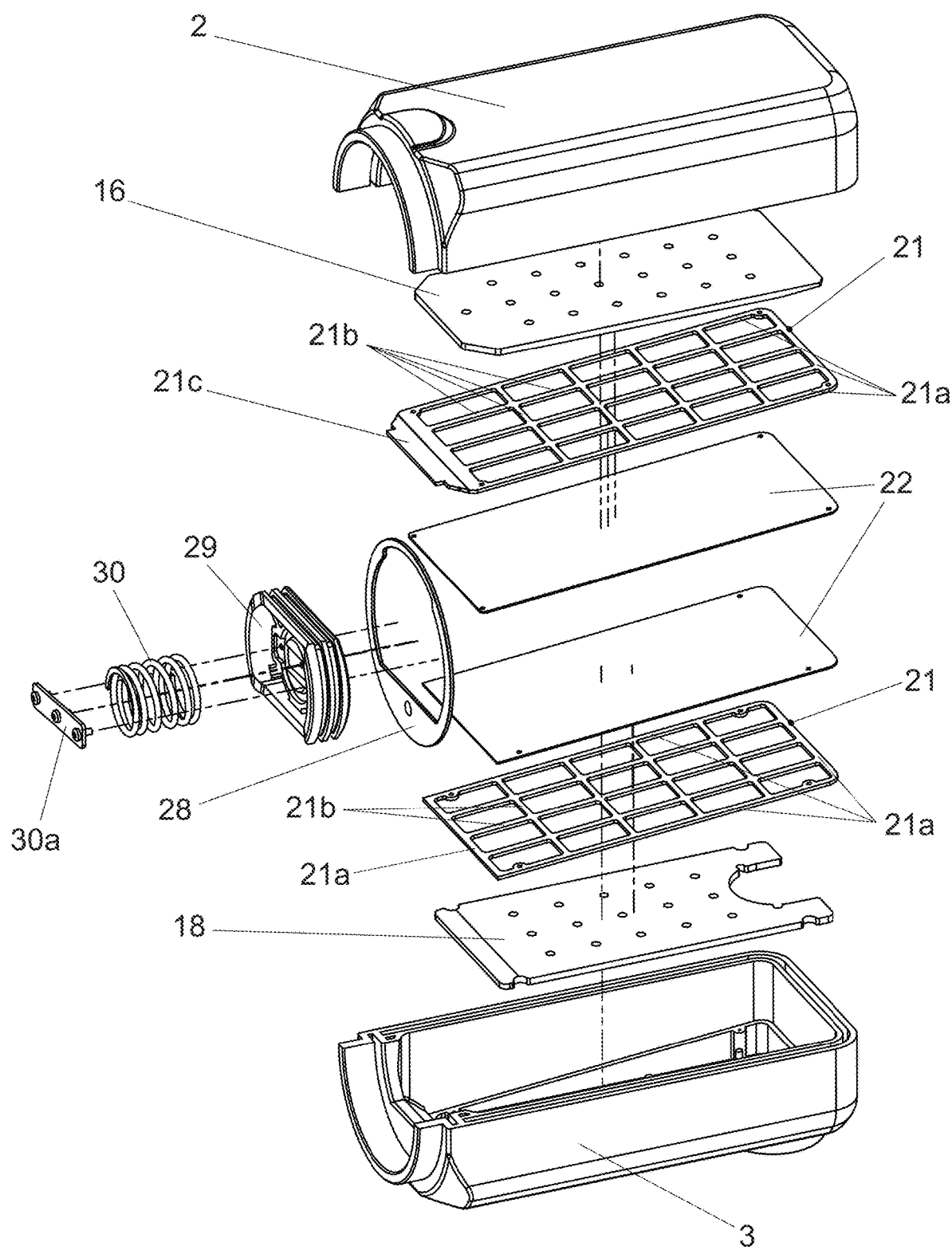
Figure 6:
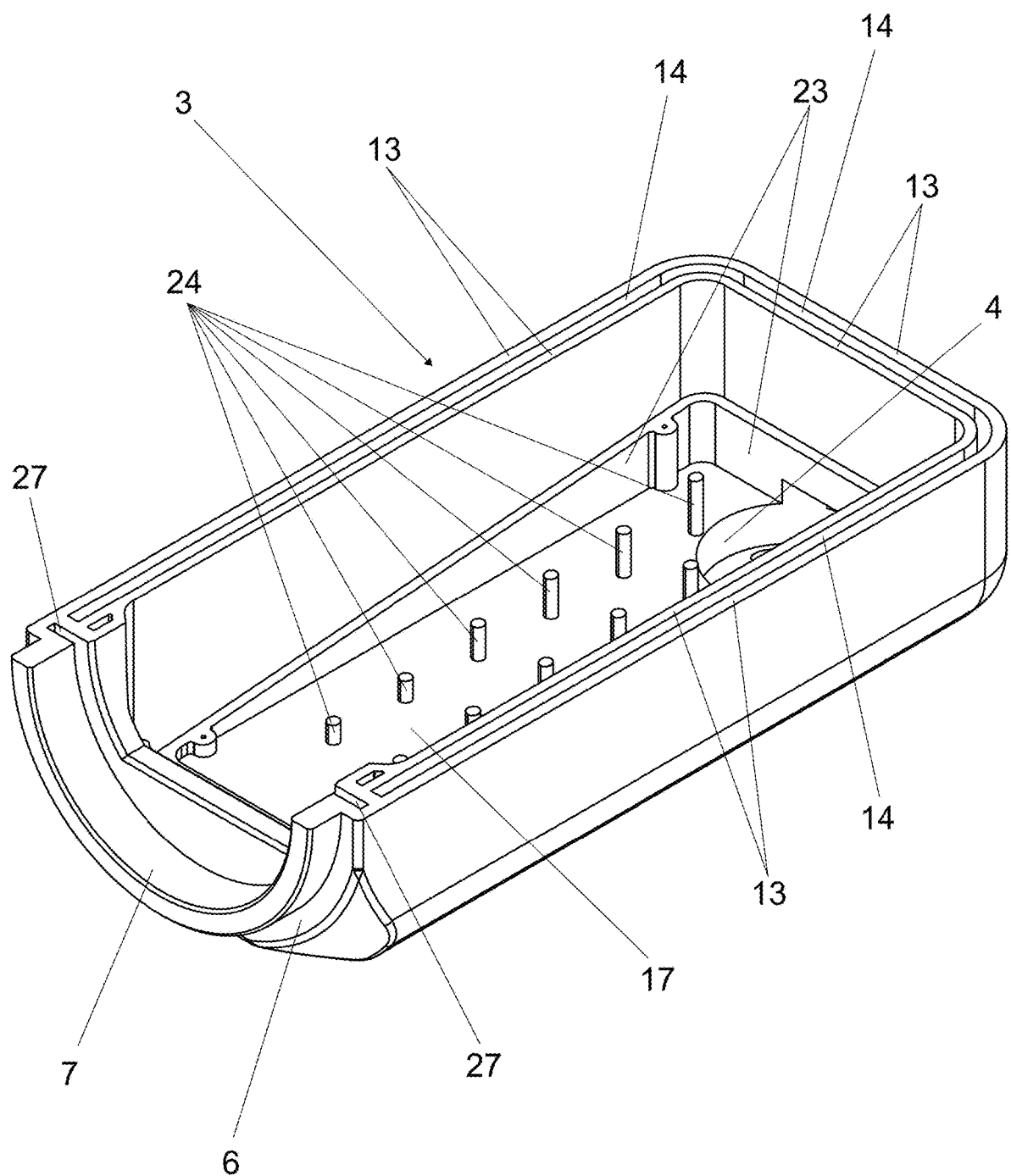
Figure 7:
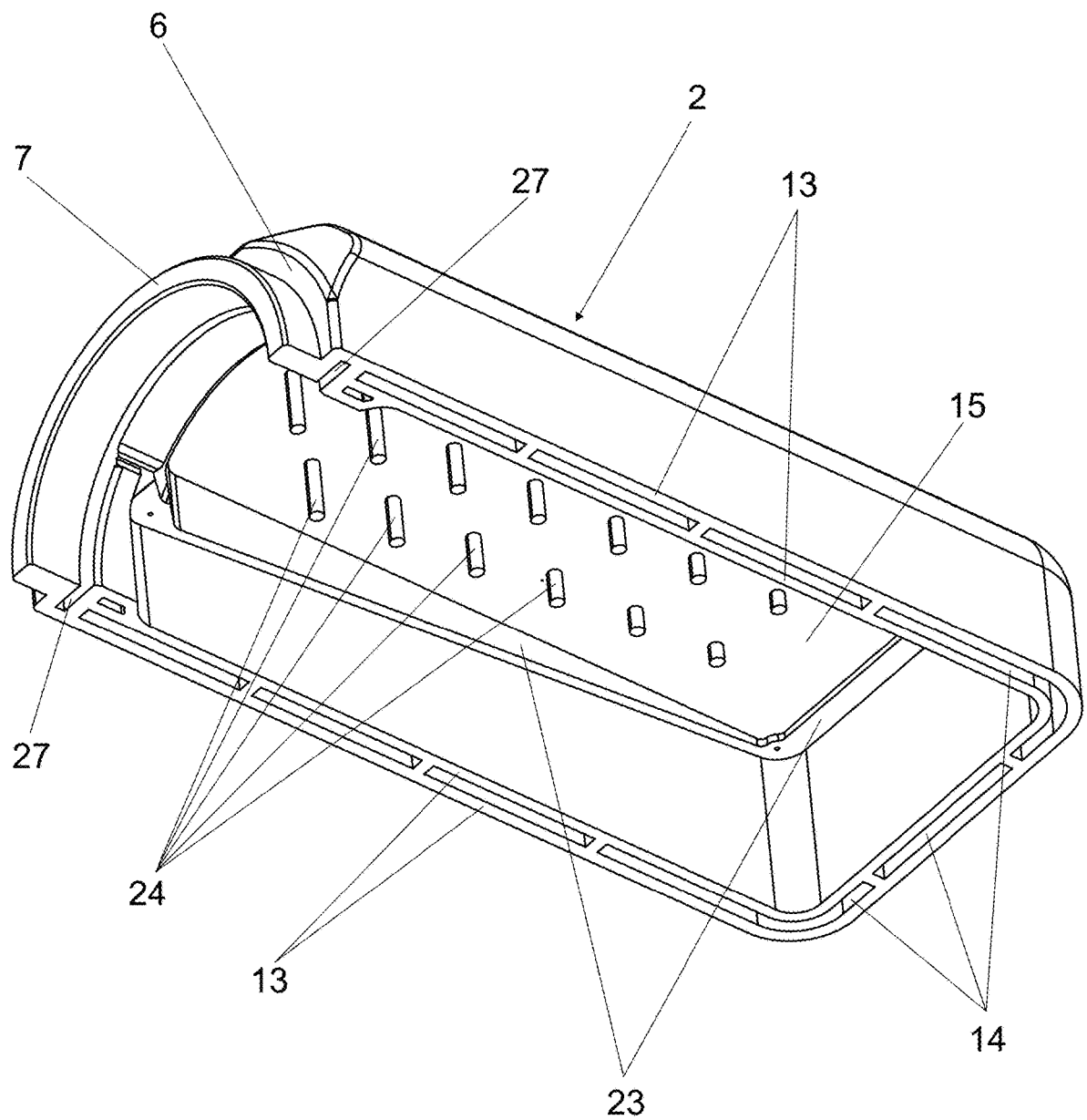
Figure 8:
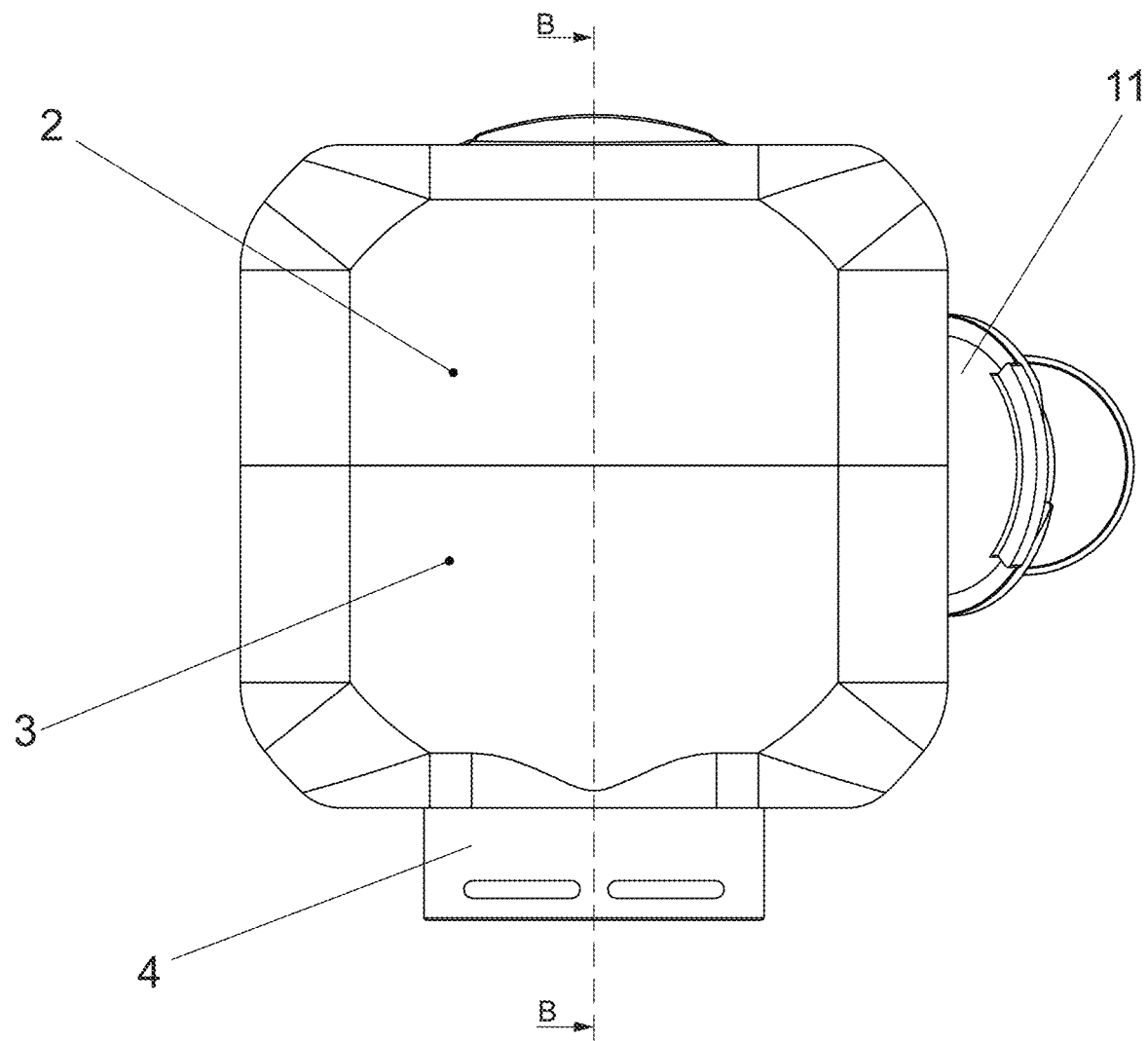
Figure 9:
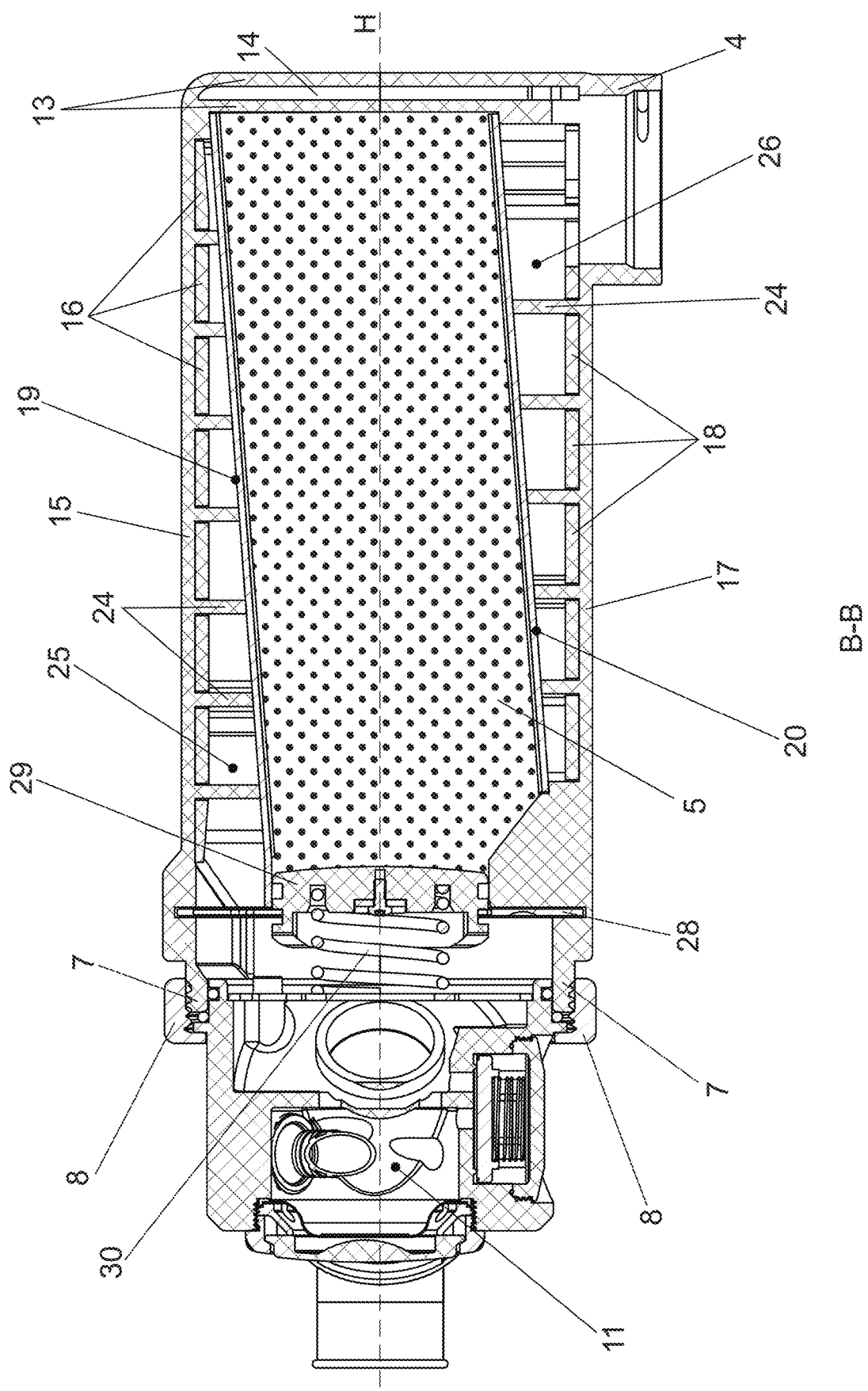
Figure 10:
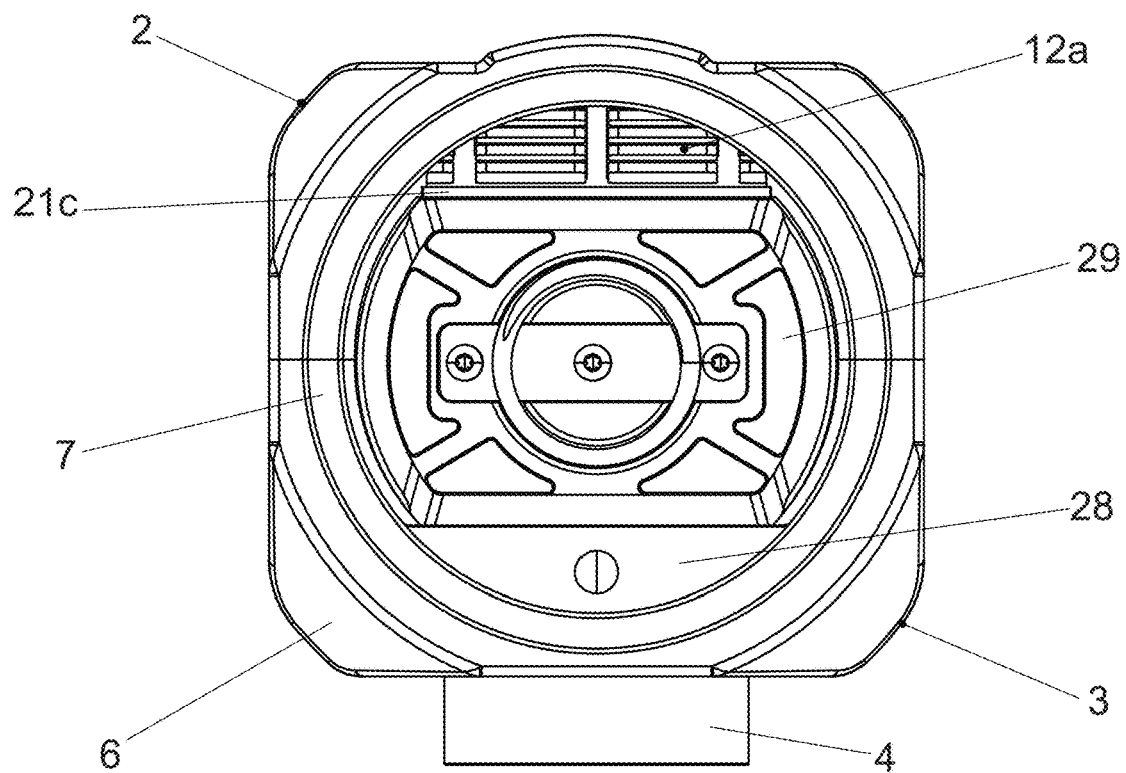
Figure 11:
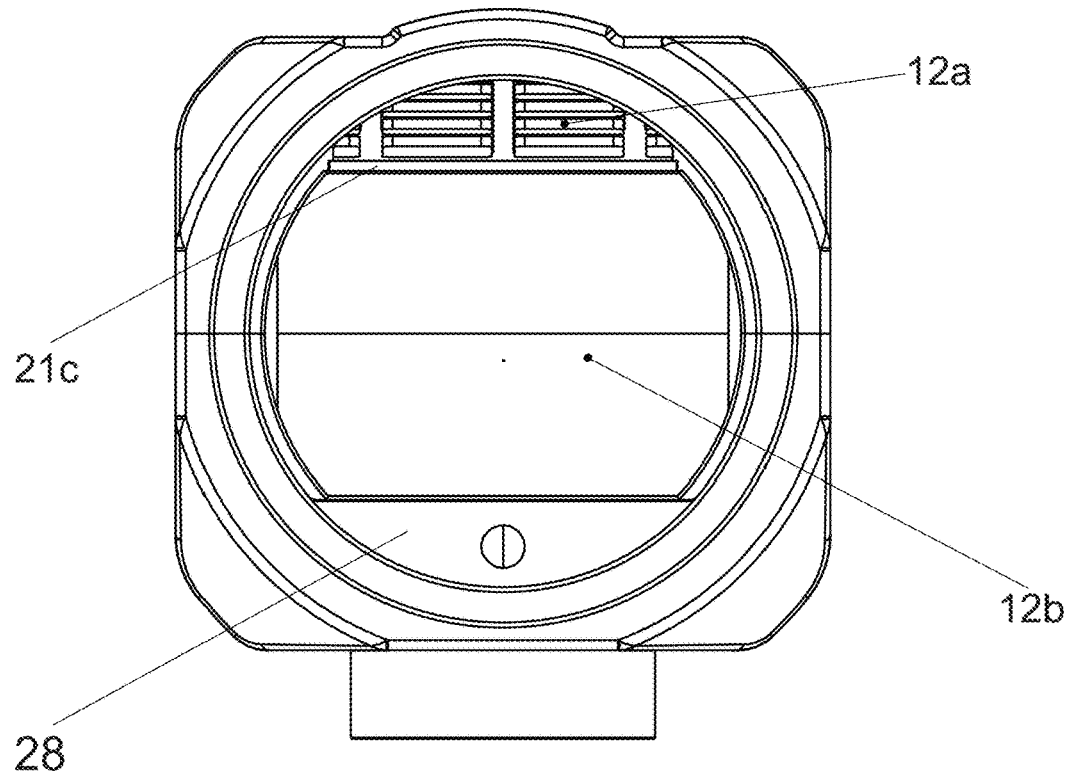
Figure 12:
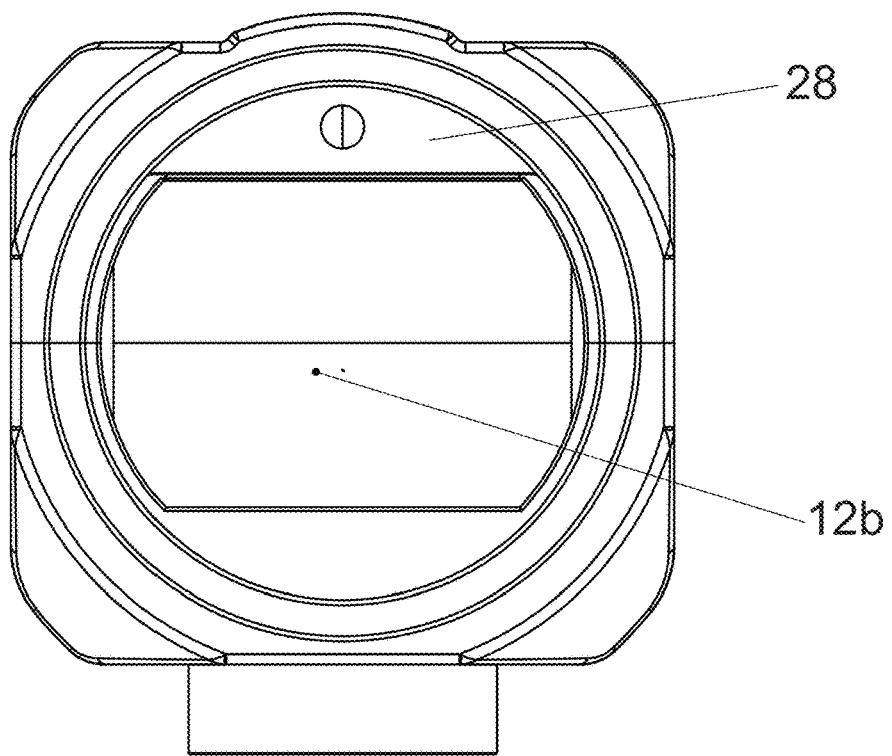
Figure 13:
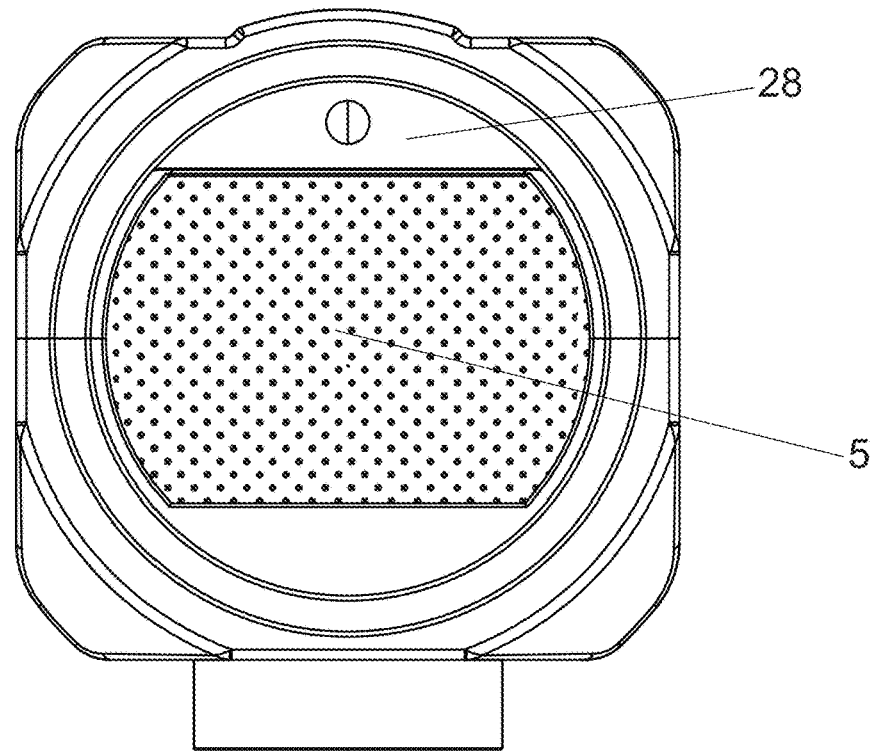
Figure 14:
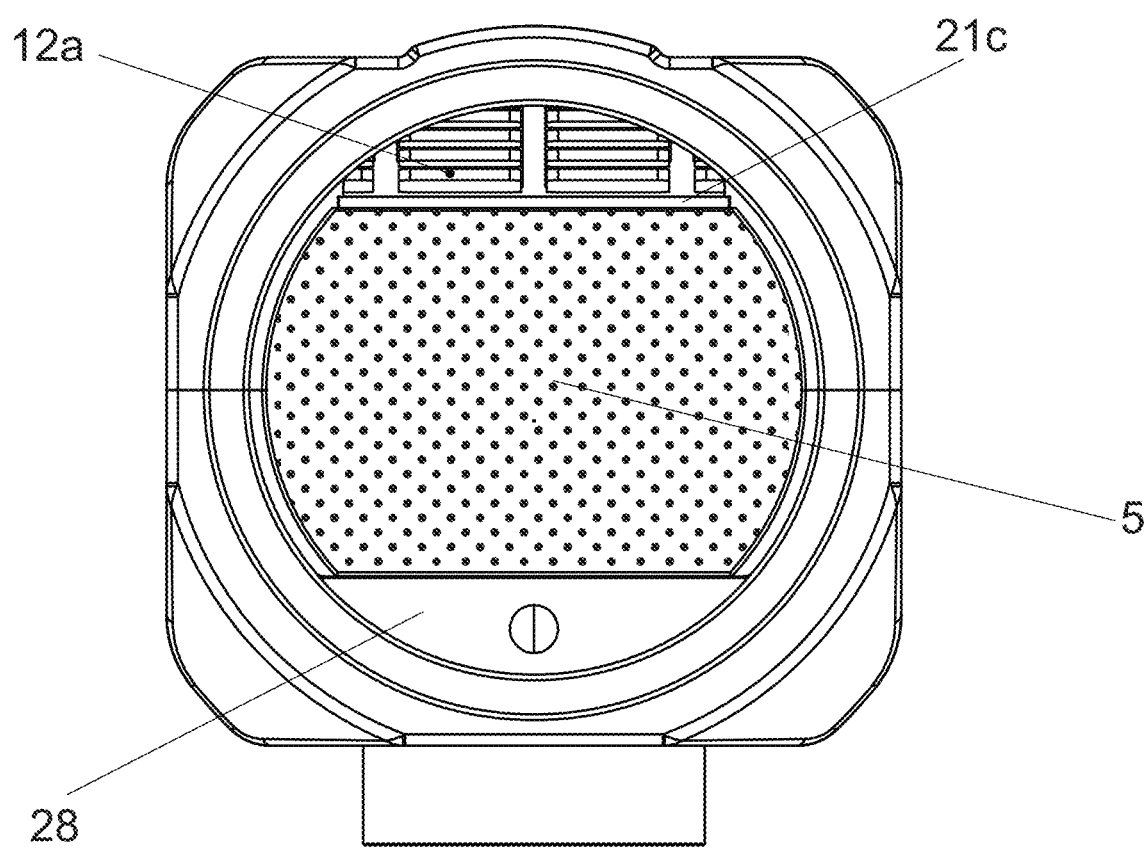
Figure 15:
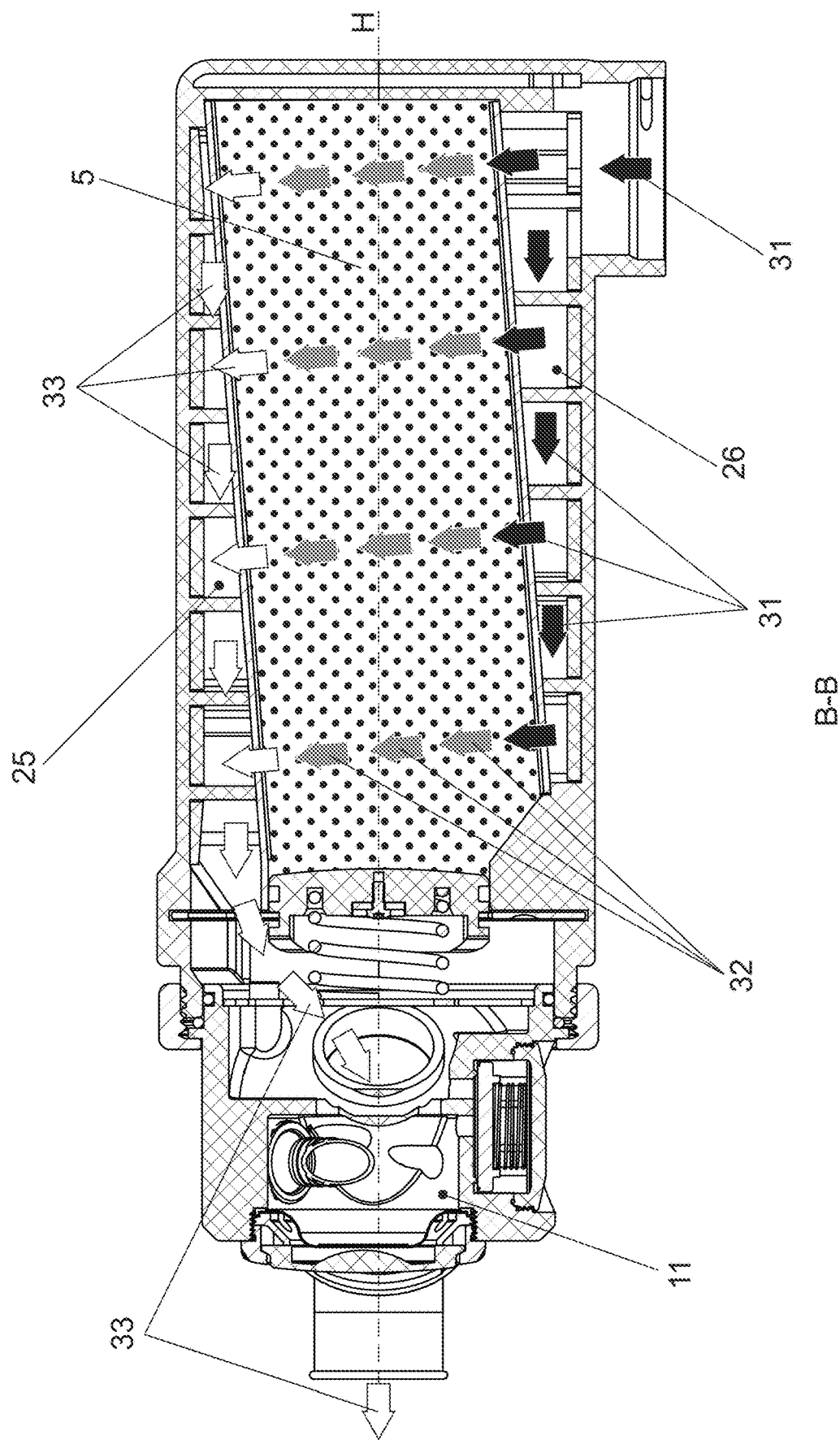
Figure 16:
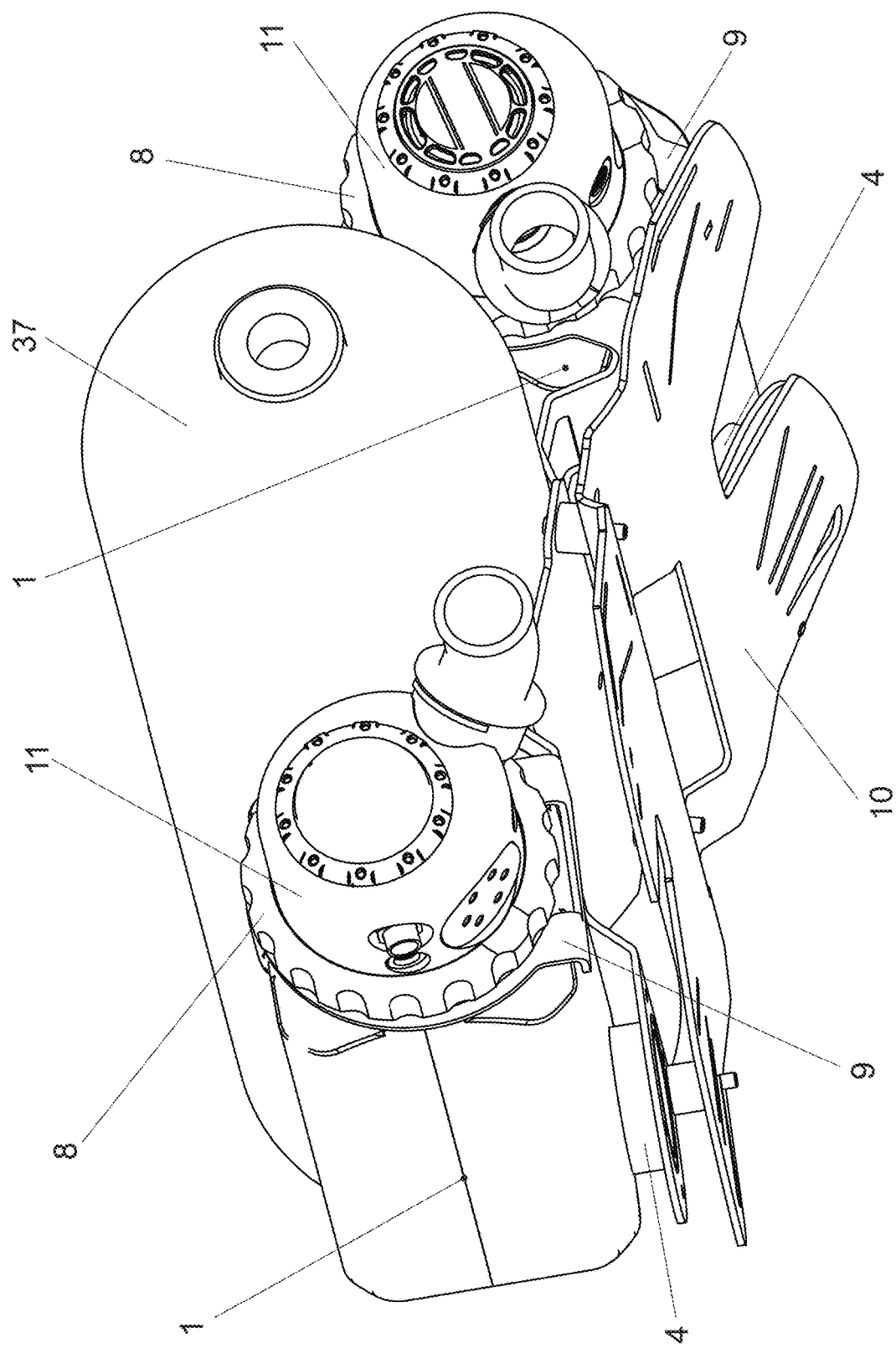
Figure 17:
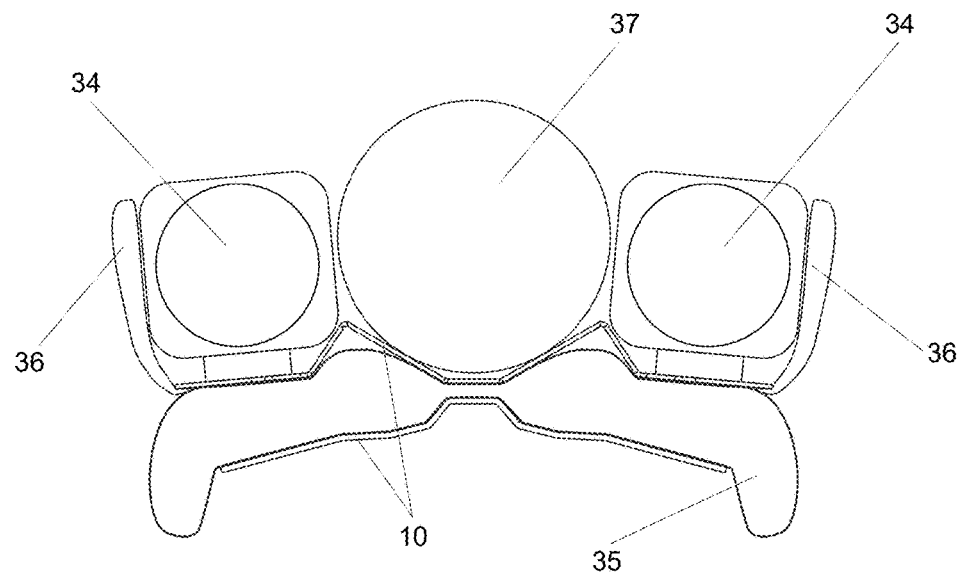
Figure 18:
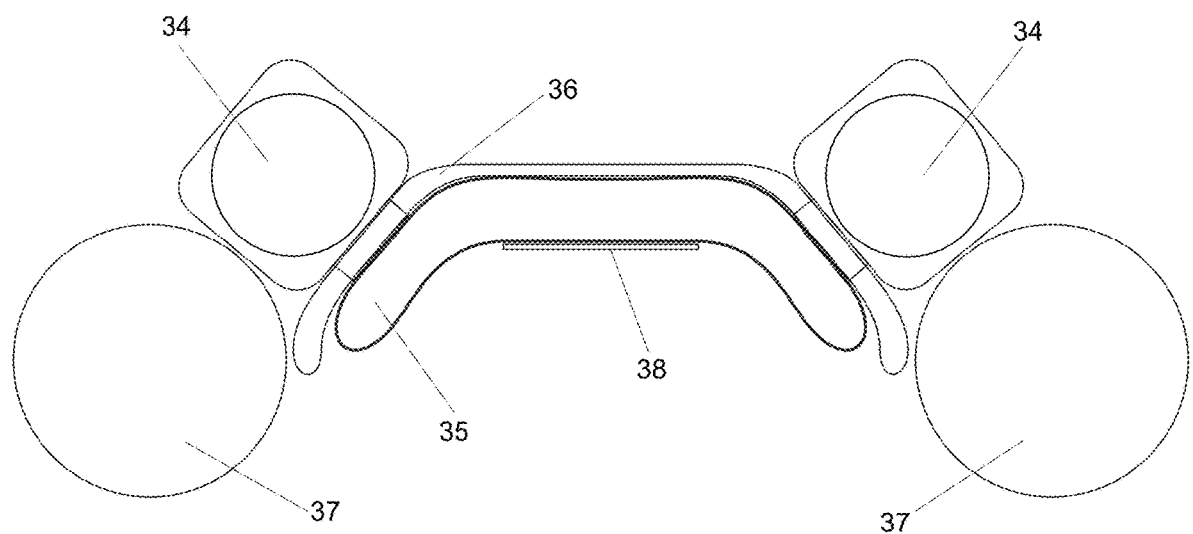

The object of the invention is presented in an embodiment on the drawing of a compact canister of carbon dioxide absorbent bed (scrubber), wherein:

FIG. 1 presents an isometric view of a compact canister of carbon dioxide absorbent bed (scrubber) without the absorbent with the plug retracted, FIG. 2 presents a side view of the compact canister of carbon dioxide absorbent bed (scrubber) with the marked line of cross-section A-A-working position of the device, FIG. 3 presents cross-section A-A FIG. 2, FIG. 4 presents cross-section A-A FIG. 2 with the highlighted cross-section shape of the air channels and the absorbent bed, FIG. 5 presents an exploded view in isometric projection of the elements of the compact canister of carbon dioxide absorbent bed (scrubber), FIG. 6 presents an isometric view of the lower part of the housing of the compact canister of carbon dioxide absorbent bed (scrubber), FIG. 7 presents an isometric view of the upper part of the housing of the compact canister of carbon dioxide absorbent bed (scrubber), FIG. 8 presents a rear view with the line of cross-section B-B of the compact canister of carbon dioxide absorbent bed (scrubber) presented with the head, FIG. 9 presents cross-section B-B FIG. 8, FIG. 10 presents a front view of compact canister of carbon dioxide absorbent bed (scrubber) with attached plug, rotary aperture in the working position, FIG. 11 presents a front view of a compact canister of carbon dioxide absorbent bed (scrubber) with the plug removed, before filling with absorbent, rotary aperture in the working position, FIG. 12 presents a front view of a compact canister of carbon dioxide absorbent bed (scrubber) with the plug removed, before filling with absorbent, rotary aperture in the filling position, FIG. 13 presents a front view of a compact canister of carbon dioxide absorbent bed (scrubber) with the plug removed, after filling with absorbent, rotary aperture in the filling position, FIG. 14 presents a front view of a compact canister of carbon dioxide absorbent bed (scrubber) with the plug removed, after backfilling with absorbent, rotary aperture in the working position, FIG. 15 presents a diagram of the flow of a gas stream through a compact canister of carbon dioxide absorbent bed (scrubber) on cross-section B-B FIG. 8, FIG. 16 presents an isometric view of an example backmount configuration (with one cylinder on the back) using two compact canisters of carbon dioxide absorbent bed (scrubber) without the elements of the breathing loop and counterlung, FIG. 17 presents a schematic drawing of an exemplary backmount configuration (with one cylinder on the back) using two compact canisters of carbon dioxide absorbent bed (scrubbers), FIG. 18 presents a schematic drawing of an example sidemount configuration (with two cylinders on the sides) using two compact canisters of carbon dioxide absorbent bed (scrubbers).

The compact canister of carbon dioxide absorbent bed (scrubber) (1) has a cuboid shape.

The housing (2, 3) of the compact canister of carbon dioxide absorbent bed (scrubber) (1) according to the invention is composed of two parts: the upper part of the housing (2) and the lower part of the housing (3). The upper part of the housing (2) and the lower part of the housing (3) are permanently joined together during the manufacturing process by gluing and welding. In the embodiment example, the housing (2, 3) of the scrubber canister (1) is made of plastic.

The lower part of the housing (3) is equipped with a connector (4) of the counterlung, which also constitutes a channel for draining condensate formed as a result of chemical reactions occurring in the absorbent bed (5).

One side wall (6) is provided with a threaded flange (7). The collar (7) is used to attach to the scrubber canister (1), using the mounting ring (8), the clamp (9) of the diving harness (10) and the head of the scrubber (11). The side wall (6) with a flange (7) has an opening (12).

The three other side walls of the housing (2, 3) have double side walls (13). Between the side walls (13) there is an air chamber (14) that constitutes thermal insulation.

Thermal insulation of the scrubber canister (1) is crucial, as cold absorbent is less effective and chemical reactions occur too slowly in it. In the solution used, all the places where the absorbent comes into contact with the housing (2, 3) of the scrubber canister (1) have double side walls with air chambers (14) that constitute thermal insulation.

The upper wall (15) of the scrubber canister (1), on the internal side of the device, is provided with an upper thermal insulation plate (16). The lower wall (17) of the scrubber canister (1), on the internal side of the device, is provided with a lower thermal insulation plate (18). Both plates of thermal insulation (16, 18) are properly profiled to protect the entire internal area of the given wall (15, 17) of the scrubber canister (1). The thermal insulation plates (16, 18) in the embodiment are made of foamed polyvinyl chloride.

Inside the scrubber canister (1) parallel to each other and at an angle to the longitudinal axis (H) of the scrubber (1) are two screens, the top screen (19) and the bottom screen (20). In the embodiment, the screens are inclined with respect to the longitudinal axis (H) at an angle of 5°.

The screen (19, 20) consists of a holder (21) and a mesh (22). The holder (21) provides the screen (19, 20) with rigidity and ensures that the screen does not deform when filling the bed. The mesh (22) of the screen (19, 20) ensures free flow of gas, while preventing absorbent granules from entering the breathing loop. In the embodiment example, the holder (21) is made of stainless steel while the mesh (22) is an openwork mesh made of stainless wire.

The screen can also be made as a single element, allowing air to flow freely through the screen, such as the openwork mesh itself or a perforated plastic or metal element. It is only important that the mesh of the screen be smaller than the diameter of the granules of standard absorbents. For example, Sofnolime 797 soda lime has granules ranging from 1.0 mm to 2.5 mm in diameter.

The proper inclination of the screens (19, 20) with respect to the longitudinal axis (H) of the scrubber canister (1) is provided by the frame (23) and supports (24) respectively positioned inside both parts of the housing (2, 3).

The outer part (21a) of the holder (21) of the screen (19, 20) rests on the frame (23), while the ribs (21b) of the holder (21) rest on the supports (24). The screen (19, 20) is permanently connected to the frame (23). In the embodiment, the screen (19, 20) is bolted to the frame (23) with four screws (not shown in the figures). Additionally, the frame (23) and supports (24) prevent the screens (19, 20) from bending during filling the bed.

The height of the frame (23) and supports (24) relative to a given wall (15, 17) of the housing varies linearly along the longitudinal axis (H) of the scrubber canister (1). The resulting inclination determines the angle at which the screens are inclined with respect to the longitudinal axis (H) and, consequently, the angle of inclination of the scrubber canister of the absorbent bed (5) with respect to the longitudinal axis (H) of the canister (1). In the example, the angle is 5°.

Air channels are formed between the housing and a given screen. Upper air channel (25) and lower air channel (26). The cross sections of the upper (25) and lower (26) air channels have a rectangular shape.

The cross-sectional area of the upper air channel (25) increases toward the side wall (6) with the flange (7). The cross-section of the upper air channel (25) is linearly dependent on the surface area of the absorbent bed (5), from which the carbon dioxide-treated gas stream (32) is drawn.

The cross-sectional area of the lower air channel (26) decreases toward the side wall (6) with the flange (7). The cross-section of the lower air channel (26) is linearly dependent on the surface area of the absorbent bed into which the stream of gas saturated with carbon dioxide (31) is delivered.

The holder (21) of the top screen (19) is provided with an extension (21c) splitting the opening (12) in the side wall (6) with the flange (7) into two parts—the opening (12a) of the upper air channel (25) and the filling port (12b).

In the proposed design, air channels (25, 26) located at the top and bottom of the absorbent bed (5) additionally constitute thermal insulation of the bed (5). Thermal insulation plates (16, 18) prevent condensation of water vapor from the air inside the channels (25, 26).

The design allows easy draining of condensate and water (which are products of chemical reactions) from the absorbent bed (5) through the counterlung connector (4) located at the bottom of the housing (3) of the scrubber (1).

In the existing solutions, increasing the volume of the absorbent bed involves increasing the diameter of the device or increasing the height of the bed and thus increasing the breathing resistance associated with elongating the path that the gas stream must take through the absorbent bed.

The presented solution allows increasing the volume of the bed (5) by elongating the scrubber canister (1). The longer scrubber canister has more space for the absorbent (5)

while maintaining the same diameter of the canister (in our case, while keeping the cross-sectional area of the scrubber identical). Increasing the length of the scrubber canister (1) elongates the bed (5) but does not entail a change in its height, and thus respiratory resistance remains at an optimal level. In addition, elongating the bed (5) while maintaining its height reduces breathing resistance, as the same gas flow is distributed over a larger working area of the bed (5).

The housing (2, 3) on the side wall (6) with the flange (7) is provided with a guide (27), in which the rotary aperture (28) is embedded. The aperture (28) can rotate around the longitudinal axis (H) of the scrubber canister (1) by 360°.

The role of the rotary aperture is to protect the breathing loop from getting absorbent into it when the scrubber canister is filled. The rotary aperture (28) facilitates correct filling of the scrubber canister (1) with absorbent (5).

The rotary aperture can be set in one of two positions: in the working position (precisely presented on FIG. 10, FIG. 11, FIG. 14) or in the filling position (precisely presented on FIG. 12, FIG. 13).

In the filling position, the aperture (28) closes access to the upper air channel (25) and prevents absorbent granules (5) from entering it.

When the aperture is in the working position, the opening (12a) of the upper air channel (25) is open and the filling port (12b) is blinded with a plug (29). A spring (30) is attached to the plug (29) by means of a screwed-on attachment (30a). The spring (30) is pushed by the attached head (11), which prevents the plug (29) from accidentally falling out and the absorbent from entering the breathing loop. Additionally, the plug (29) blocks the spontaneous rotation of the aperture (28).

The use of a rotary aperture (28) greatly increases the safety of using the scrubber (1). When filling the scrubber canister (1), the aperture (28) prevents the absorbent (5) (which is an irritant that can cause skin burns, eye damage and respiratory irritation) from entering the breathing loop.

Additionally, the above solution is resistant to possible user errors, if a diver forgets to leave the aperture in the working position after filling in the absorbent, during the first test of the device's operation, high breathing resistance will indicate an obstructed air channel and leaving the aperture in the filling position.

The proposed design minimizes the risk of the channeling effect, that is, the effect of uneven gas flow through the bed, which causes faster wear of the bed in areas with the highest flow and the risk of an increase in $CO_2$ concentration, even though the entire bed still has a high absorption capacity. The biggest influence on its occurrence is the unskillful filling of the bed, i.e. when the absorbent is loose (poorly compacted) in some places. The larger the surface area of the bed when filling the bed, the more difficult it is to arrange the absorbent evenly, and thus the risk of the aforementioned effect is greater.

The use in the above invention of filling through the shorter side wall causes that the height of the bed (restricted by screens from the top and bottom) is always perfectly uniform, which eliminates the possibility of channeling effect occurrence.

The gas flow through the scrubber canister (1) and head (11) is presented on cross-section B-B of the canister (1) (FIG. 15). The stream of gas saturated with $CO_2$ (31) flows through the connector (4) of the counterlung through the lower air channel (26) into the absorbent bed (5). In the absorbent bed (5) on the basis of a catalytic chemical reaction from the gas stream (32) flowing through the absorbent, carbon dioxide is removed (by means of an exothermic reaction with the participation of water). The stream of purified gas $CO_2$ (33) flows through the upper air channel (25) into the head (11) and then into the breathing loop.

The proposed solution with channels (25, 26) of variable cross-section, linearly dependent on the surface area of the absorbent bed (5) provides the possibility of obtaining constant pressure of the gas stream (31, 32, 33) flowing through the device, which guarantees correct (i.e. uniform) gas flow through the entire absorbent bed (5). The amount of gas flowing is greatest near the entry and exit, so that's where the channels must have the largest cross-section. Less gas flows at the end of the channel, so its cross-section may be smaller.

In the case of two scrubbers, the gas flow in the second device is in the opposite direction (from the head to the counterlung), but all other relationships described above are identical.

To better illustrate the invention, its use in two example configurations is presented. In the backmount configuration (with one cylinder on the back) on FIG. 16 and FIG. 17 and in the sidemount configuration (with two cylinders on the sides) on FIG. 18.

In the diving configuration presented on FIG. 16 and FIG. 17—backmount with one cylinder, there are two identical scrubber canisters (1). The head (11) on the exhale side is equipped with an ADV (Automatic Diluent Valve) and on the inhale side with $O_2$ sensors. The heads (11) used in the embodiment are made according to solutions known in the state of the art and their construction requires no further explanation. The scrubbers (34) are attached to the clamps (9) of the rigid diving harness (10) and connected via connector (4) to the counterlung (35). The rigid diving harness (10) constitutes an adequately shaped metal plate. The buoyancy compensator (36) is located on the sides of the head scrubber canisters (34). In the presented configuration, one diluent (37) cylinder (air or trimix) is attached to the diving harness (10). For the sake of figure clarity, some elements such as the manual addition valve MAV, oxygen cylinder and breathing loop have been omitted.

In the diving configuration presented on FIG. 18—sidemount with two cylinders on the sides there are two identical scrubber canisters (1). The head (11) on the exhale side is equipped with an ADV (Automatic Diluent Valve) and on the inhale side with $O_2$ sensors. The heads (11) used in the embodiment are made according to solutions known in the state of the art and their construction requires no further explanation. The scrubbers (34) are attached to the clamps (9) of the soft diving harness (38) (e.g. xDEEP Stealth 2.0[7][8]) and connected via connector (4) to the counterlung (35). The buoyancy compensator (36) is located below the canisters (34) with heads. In the presented configuration, two cylinders with diluent (37) (air or trimix) are attached to a soft diving harness (38). For the sake of figure clarity, some elements such as the manual addition valve MAV, oxygen cylinder and breathing loop have been omitted.

[7] https://www.xdeep.eu/files/manuals/xdeep stealth manual pl.pdf
[8] https://www.xdeep.pl/files/manuals/xdeep_stealth_manual_en.pdf As can be seen in the figure above, the compact canister of carbon dioxide absorbent bed (scrubber) (1) according to the invention provides full versatility of components, the same canisters (1), heads (11), manual addition valve MAV and breathing loop can be used in both backmount and sidemount configurations.

The only variable elements dependent on the diving configuration, are the rigid (10) or soft (38) diving harness and a counterlung (35) appropriate for the harness.

Summing up, the compact canister of the carbon dioxide absorbent bed (scrubber) (1) with a cross-flow with channels of constant pressure across the entire cross-section described in the embodiment ensures proper (i.e. uniform) gas flow through the entire absorbent bed.

The compact canister of carbon dioxide absorbent bed (scrubber) (1) according to the invention makes it possible to increase the volume of the bed while keeping the same outer diameter-ensuring portability and the ability to integrate it into a harness. The scrubber (1) according to the invention makes it possible to increase the volume of the bed while maintaining the same height of the bed-ensuring that breathing resistance is minimized.

The device according to the invention provides improved thermal insulation without increasing the diameter of the device. It minimizes the risk of the channeling effect. It prevents the absorbent from entering the breathing loop. It facilitates draining condensate and water from the bed, which is a product of chemical reactions.

The compact canister of carbon dioxide absorbent bed (scrubber) (1) according to the invention provides full component versatility, and can be used in both sidemount and backmount configurations.

LIST OF DESIGNATIONS

1. Compact canister of the bed of carbon dioxide absorbent (scrubber)
2. Upper part of the scrubber canister housing
3. Lower part of the scrubber canister housing
4. Counterlung connector
5. Absorbent (absorbent bed)
6. Side wall with the flange
7. Flange
8. Retaining ring
9. Diving harness clamp
10. Rigid diving harness
11. Scrubber head
12. Opening of the side wall with flange
12 *a*. Opening of the upper air channel
12 *b*. Filling port
13. Double side walls
14. Air chamber between the double side walls (thermal insulation)
15. Upper wall of the scrubber canister
16. Upper plate of thermal insulation
17. Lower wall of the scrubber canister
18. Lower plate of thermal insulation
19. Top screen
20. Bottom screen
21. Screen holder
21*a*. Outer part of the screen holder
21*b*. Ribs of the screen holder
21*c*. Extension of the outer part of the screen holder
22. Screen mesh
23. Frame (located inside the housing)
24. Supports (located inside the housing)
25. Upper air channel
26. Lower air channel
27. Aperture guide
28. Rotary aperture
29. Filling port plug
30. Plug pressure spring
30*a* Attachment of the plug pressure spring
31. Stream of gas saturated with carbon dioxide
32. Stream of gas flowing through the absorbent bed
33. Stream of gas cleaned of carbon dioxide
34. Scrubber-compact canister of carbon dioxide absorbent bed with a head
35. Counterlung
36. Buoyancy compensator
37. Diving cylinder with diluent
38. Soft diving harness
H Longitudinal axis of the compact canister of carbon dioxide absorbent bed (scrubber)

The invention claimed is:

1. A compact canister for a carbon dioxide absorbent bed (scrubber), comprising: a housing consisting of permanently connected upper and lower parts, the housing having a side wall of which is provided with an opening blocked sealed by a plug with a spring and a flange attaching the head of the a scrubber head, and a bottom lower wall provided with a connector connecting of the to a counterlung;
   inside the housing (2, 3) of the scrubber canister there are two screens attached, the a top screen and a bottom screen disposed within the housing, wherein between which there is an absorbent bed
   positioned between characterized in that the top screen and the bottom screen; wherein the top screen and bottom screen are parallel to each other, the top screen is secured attached along adjacent to the upper wall of the housing canister, defining a free space between the top screen and the upper wall to form of the canister forms an upper air channel fluid communication with connected to the opening of the side wall opening; wherein the bottom screen is secured adjacent attached along to the lower wall of the housing canister, defining a free space between the lower bottom screen and the lower wall of the canister forms to form a lower air channel
   in fluid communication with connected to the connector (4) of the counterlung connector; and wherein the flow of the stream of gas flows through in the absorbent occurs across the absorbent bed in a direction perpendicular to the planes of the top and bottom screens (19, 20).

2. The compact canister for the bed of carbon dioxide bed absorbent (scrubber) according to claim 1, characterized in that wherein the top screen and the bottom screen are inclined at an acute angle with respect to a longitudinal axis of the canister, a cross-sectional area of the upper air channel increases in the direction of the side wall with the opening, the cross-sectional area of the lower air channel decreases in the direction of the side wall with the opening, further, and wherein the absorbent bed is inclined with respect to the longitudinal axis of the canister at an acute angle with the same value as the angle at which the parallel screens (19, 20) are inclined.

3. The compact canister for the bed of carbon dioxide bed absorbent (scrubber) according to claim 2, characterized in that wherein a cross section of the upper air channel has a rectangular shape, the cross section of the lower air channel has a rectangular shape, and the cross section of the absorbent bed has a rectangular shape.

4. The compact canister for the carbon dioxide absorbent bed (scrubber) according to claim 1, characterized in that wherein all the side walls of the canister except for the side wall with the opening, have double side walls between which there is an air chamber and the upper wall of the canister, on an internal side of the device, is provided with an upper thermal insulation plate and the lower wall of the canister, on the internal side of the device, is provided with a lower thermal insulation plate.

5. The compact canister for the carbon dioxide absorbent bed (scrubber) according to claim 1, characterized in that wherein the screen (19, 20) consists of a holder with an attached mesh.

6. The compact canister for the carbon dioxide absorbent bed (scrubber) according to claim 1, characterized in that wherein the housing (2, 3) on the inside is provided with a frame and supports, a height of which relative to the upper wall and the lower wall of the housing (2, 3) varies linearly along the longitudinal axis of the scrubber canister, constituting a point of support and attachments of the holders of the screens (19, 20).

7. The compact canister for the carbon dioxide bed of carbon dioxide absorbent (scrubber) according to claim 5, characterized in that wherein the holder of the top screen is provided with an extension splitting the opening in the side wall with a flange into two parts—the opening of the upper air channel and a filling port.

8. The compact canister for the carbon dioxide absorbent bed (scrubber) according to claim 6, characterized in that wherein the housing (2, 3) on the side wall with a flange is provided with a guide in which a rotary aperture is embedded and a filling port is blinded by a plug with a spring attached to it.

* * * * *